United States Patent [19]
Morimoto
[11] 3,852,715
[45] Dec. 3, 1974

[54] CHARACTER RECOGNIZING SYSTEM

[75] Inventor: Naoki Morimoto, Tokyo, Japan
[73] Assignee: Fujitsu Limited, Kawasaki, Japan

[22] Filed: Aug. 14, 1973
[21] Appl. No.: 388,230

Related U.S. Application Data
[63] Continuation of Ser. No. 193,897, Oct. 29, 1971, abandoned.

[30] Foreign Application Priority Data
Nov. 2, 1970 Japan .............................. 45-96580

[52] U.S. Cl. .......................................... 340/146.3 Z
[51] Int. Cl. .......................................... G06k 9/18
[58] Field of Search ............ 340/146.3 H, 146.3 Y, 340/146.3 Z, 146.3 R

[56] References Cited
UNITED STATES PATENTS
3,108,254 10/1963 Dimond ...................... 340/146.3 R
3,112,468 11/1963 Kamentsky .................. 340/146.3 R
3,123,804 3/1964 Kamentsky .................. 340/146.3 R
3,444,517 5/1969 Rabinow ...................... 340/146.3 B

*Primary Examiner*—Gareth D. Shaw
*Assistant Examiner*—Joseph M. Thesz, Jr.
*Attorney, Agent, or Firm*—Herbert L. Lerner

[57] ABSTRACT

A character recognizing system determines a character in a character writing frame on a card. The frame defines a character writing region having at least one character writing guide point therein and is divided into a plurality of regions utilizing the character writing guide point as a reference point. A character determining circuit in operative proximity with the card determines the character. The character determining circuit comprising a feature determining circuit for determining the features of the character in the regions into which the character writing region is divided. A feature discriminating circuit is connected to the feature determining circuit for determining the character from the features determined by the feature determining circuit.

1 Claim, 29 Drawing Figures

HORIZONTAL POSITIONING CIRCUIT

VERTICAL POSITIONING CIRCUIT

CROSSING DETECTING CIRCUIT

LONG BLACK LINE DETECTING CIRCUIT

OPENING PORTION DETECTING CIRCUIT

CHARACTER RECOGNIZING SYSTEM

Figure 1:
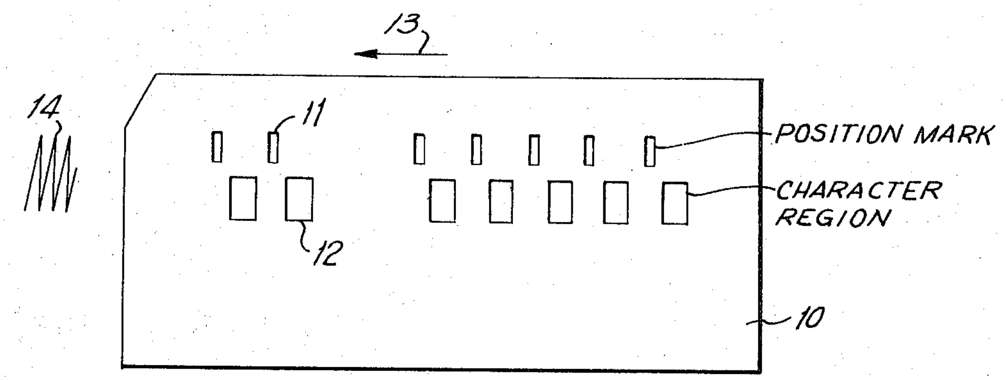

This is a continuation, of application Ser. No. 193,897, filed Oct. 29, 1971 now abandoned.

The invention relates to a character recognizing system. More particularly, the invention relates to a simplified optical character recognizing system for optically reading characters or marks written on a card.

Various kinds of character reading devices have been introduced and sold, but they are all very expensive. This invention provides a character recognizing system for obtaining a simplified optical character reading device which is inexpensive compared with the conventional devices and capable of reading characters with stability.

In a character reading device, in general, the region on a card on which a character is expected to be present is scanned by the character input part of the reading device. Only the information of the character part is selected out of the input information obtained by the scanning. Then, various features of the selected information are extracted, and thus the character can be recognized. The operation of selecting the information of the character part out of the input information is called the positioning operation. This is an important function for correctly recognizing a specific character, as far as the character is located in a specific predetermined reading range on a card.

The conventional positioning method can be divided into the method of previously reading a character to be recognized on a card and detecting the region in which the character was present. The method of detecting a character region in which a character is present is by the detection of the position mark previously printed in connection with the character region. In the first conventional positioning method, the period of time required for the position is equal to the period of time required for the scanning of the character. Therefore, in a device having only a single character input part such as, for example, a reading head, the reading speed becomes low because a character must be scanned twice. This method, moreover, requires a memory device for temporarily memorizing the character regions. It is also possible to detect the character region by the use of a reserve reading head as a positioning head provided immediately preceding the character reading head. In this case, however, the two reading heads must be controlled, and therefore the control operation becomes complicated and the system becomes expensive. The second conventional positioning method, on the other hand, can roughly discriminate the character region, but has the disadvantages that the correct positioning is difficult and the structure of the circuit is complicated.

The principal object of the invention is to provide a new and improved character recognizing system of simple structure, which is inexpensive to manufacture and which functions with efficiency, effectiveness and reliability.

An object of the invention is to provide a character recognizing system of simple structure, which is inexpensive to manufacture and which recognizes a character with accuracy and rapidity.

My invention has eliminated the aforedescribed defects by providing a system capable of recognizing a character region and a character with stability by the raster scanning of a position mark indicating the character region and a visible character writing frame which defines the character region. The character writing frame is usually printed in a color which will not disturb the reading by a man of a character in the frame, or the writing of a character in the frame, and to which the reading element of the character input part for reading characters is insensitive. It is therefore impossible for the character and the frame to be misread by the character reading device. It is also possible to read characters without the provision of position marks in my method, but in this case it is necessary to detect a character region and the character writing frame with a photoelectric element which is sensitive to the printed color of the frame. In such case, it is necessary to utilize the aforedescribed first conventional positioning method, then erase the frame with a filter, etc., and recognize the character. The character recognizing operation is thus complicated.

The system of the invention also simplifies the recognition of characters by providing for the detecting of the state of a character written around writing guide points provided within the character writing frame.

In accordance with the invention, a character recognizing system comprises a card having a character writing frame defining a character writing region having a character and at least one character writing guide point therein and being divided into a plurality of regions utilizing the character writing guide point as a reference point. Character determining means in operative proximity with the card determines the character. The character determining means comprises feature determining means for determining the features of the character in the regions into which the character writing region is divided and feature discriminating means connected to the feature determining means for determining the character from the features determined by the feature determining means.

The character writing guide point is at a predetermined position in the character writing frame.

A plurality of radial lines extend from the character writing guide point. The feature determining means comprises a feature determining circuit for determining the features of the character from the crossing of the radial lines and lines of the character in the character writing region.

A plurality of radial lines extend from the character writing guide point. The feature determining means comprises storage means for determining whether part of the character in the character writing region crosses at least one of the radial lines and indicating the determinations.

The feature determining means comprises comparing means for comparing the features determined by the feature determining means with reference features corresponding to various characters thereby determining the character in the character writing region.

In accordance with the invention, a character recognizing system comprises a card having a position mark and a character writing frame thereon in constant mutual relation, the character writing frame defining a character writing region. Reading means in operative proximity with the card reads the position mark and a character in the character writing frame from the card and produces corresponding output signals. The card is moved past the reading means to enable scanning of the card by the reading means. Position mark detecting means coupled to the reading means detects the position mark and determines the character writing position from the output signals of the reading means. Horizontal indicating means coupled to the position mark detecting means determines the character writing range of the character writing frame in the direction of movement of the card. Vertical indicating means coupled to the position mark detecting means determines the character writing range of the character writing frame in the vertical direction perpendicular to the direction of movement of the card. Position detecting means connected to the horizontal and vertical indicating means detects the position of the character writing region. Character discriminating means connected to the position detecting means discriminates the character in the character writing region.

The character writing region on the card has at least one character writing guide point therein and is divided into a plurality of regions utilizing the character writing guide point as a reference point. The character discriminating means comprises feature determining means for determining the features of the character in the regions into which the character writing region is divided and feature discriminating means connected to the feature determining means for determining the character from the features determined by the feature determining means. The character writing guide point is at a predetermined position in the character writing frame, the predetermined position being determined by the horizontal and vertical indicating means.

Figure 3:
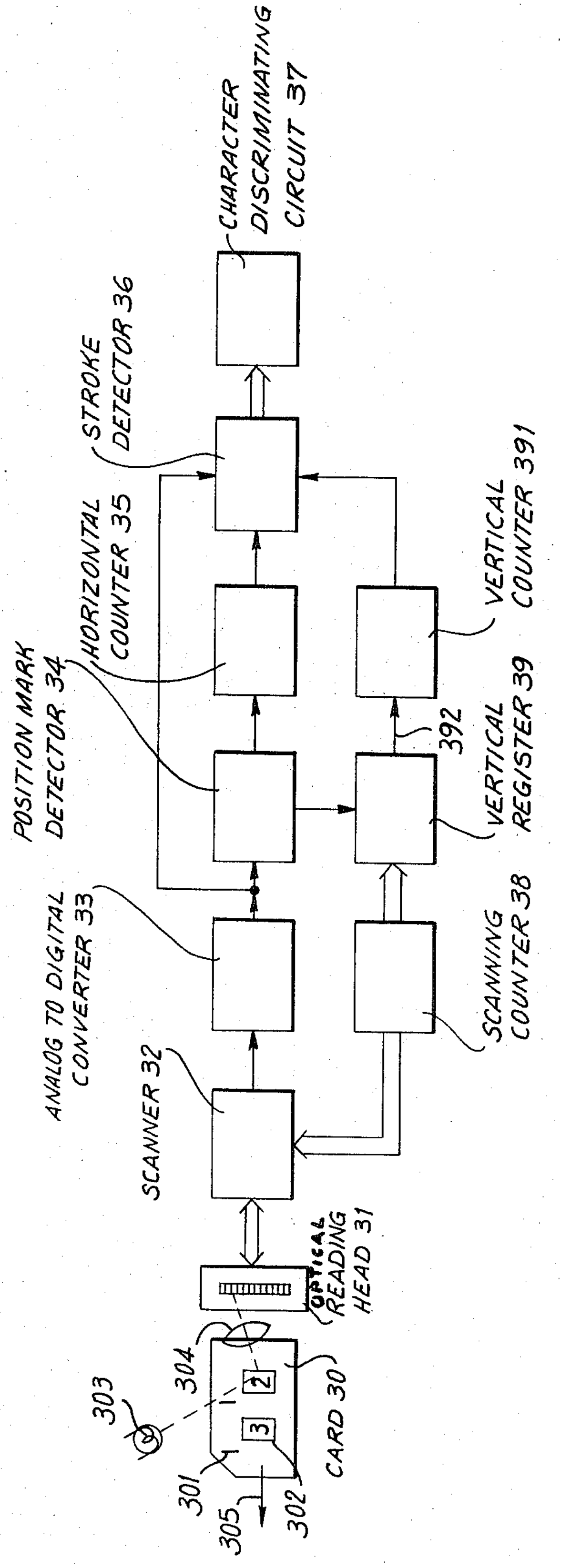
Figure 4A:
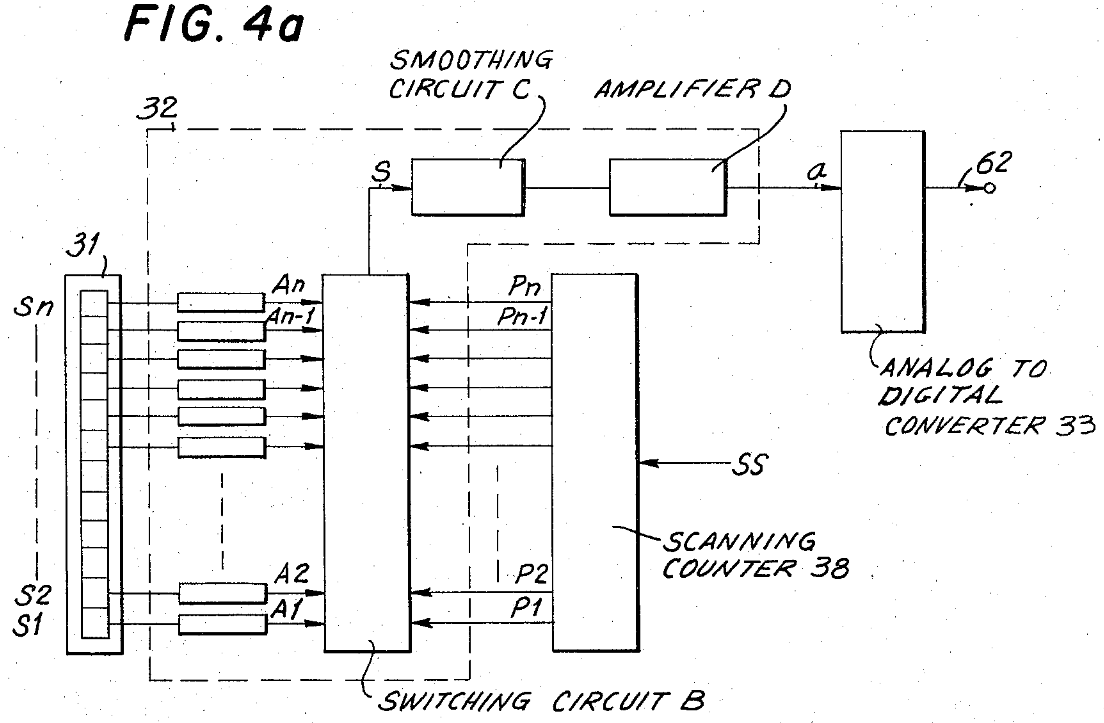
Figure 4B:
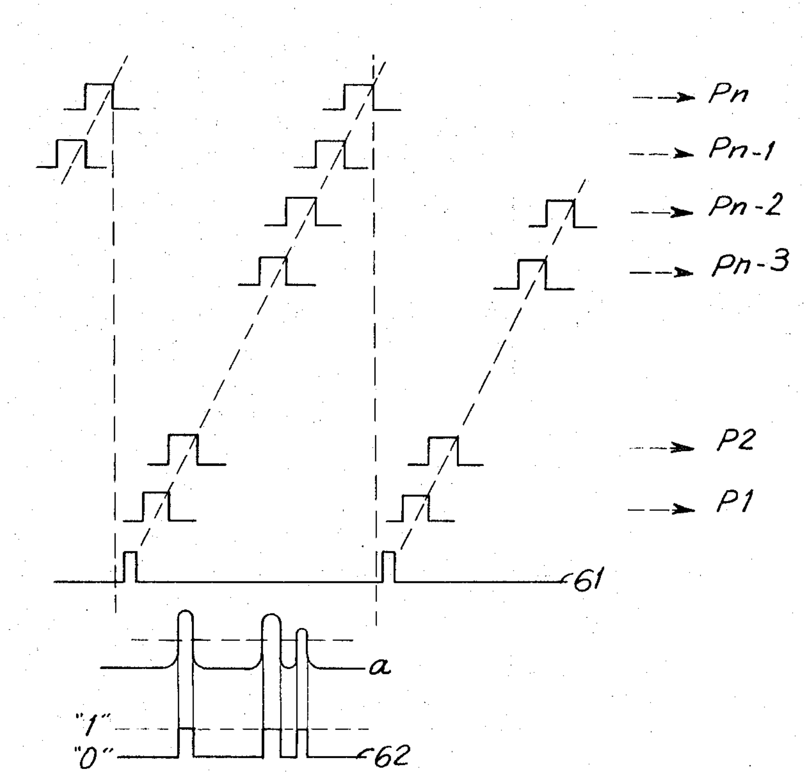

In order that the invention may be readily carried into effect, it will now be described with reference to the accompanying drawings, wherein:

FIG. 1 is a schematic diagram of a card printed in the form utilized in the character recognizing system of the invention;

FIGS. 2*a*, 2*b*, 2*c* and 2*d* illustrate the relation between the positions of the position mark and the character region printed on the card of FIG. 1 and the operating time relation of horizontal and vertical counters operated in accordance with such relation;

FIG. 3 is a block diagram of an embodiment of an optical character reading device utilized in the system of the invention;

FIG. 4*a* is a block diagram showing the details of the reading circuit of FIG. 3 comprising a reading head and a reading scanner for scanning parallel signals obtained from the card of FIG. 1, converting the parallel signals into series signals and transferring the series signals;

FIG. 4*b* is a time chart showing the operation of various parts of the reading circuit of FIG. 4*a;*

Figure 4C:
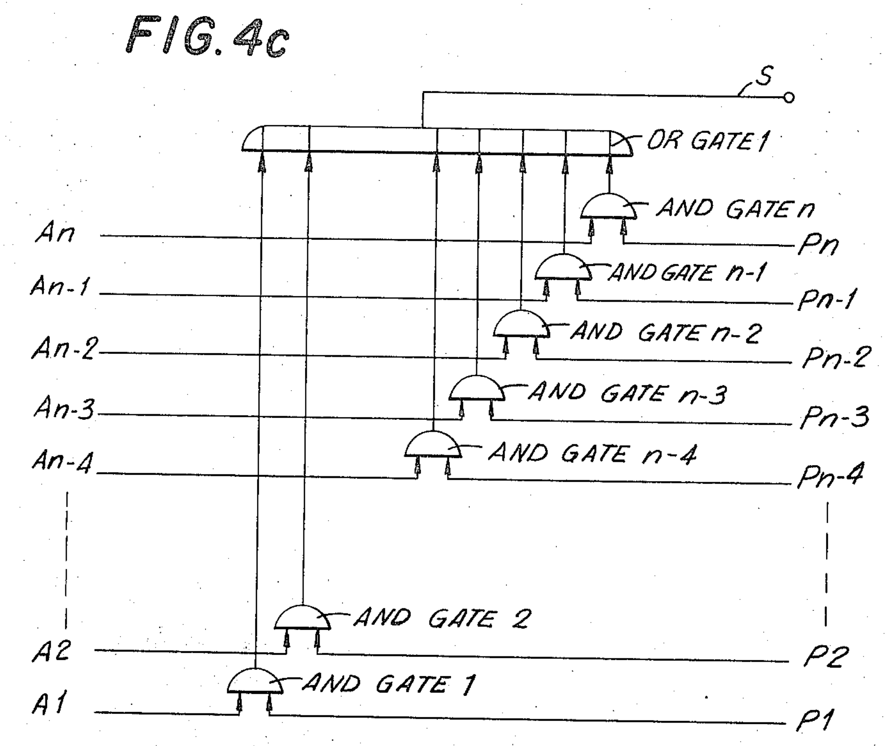

FIG. 4*c* is a circuit diagram of an embodiment of the switching circuit B of FIG. 4*a;*

Figure 4D:
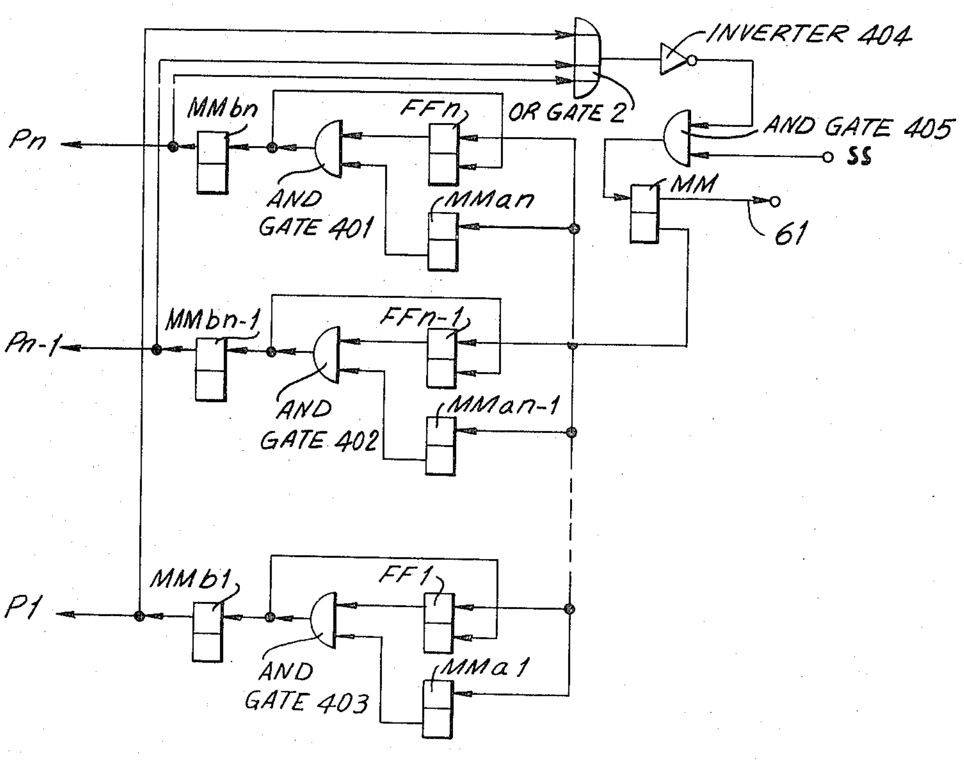

FIG. 4*d* is a block diagram of an embodiment of the scanning counter 38 of FIG. 4*a;*

Figure 5A:
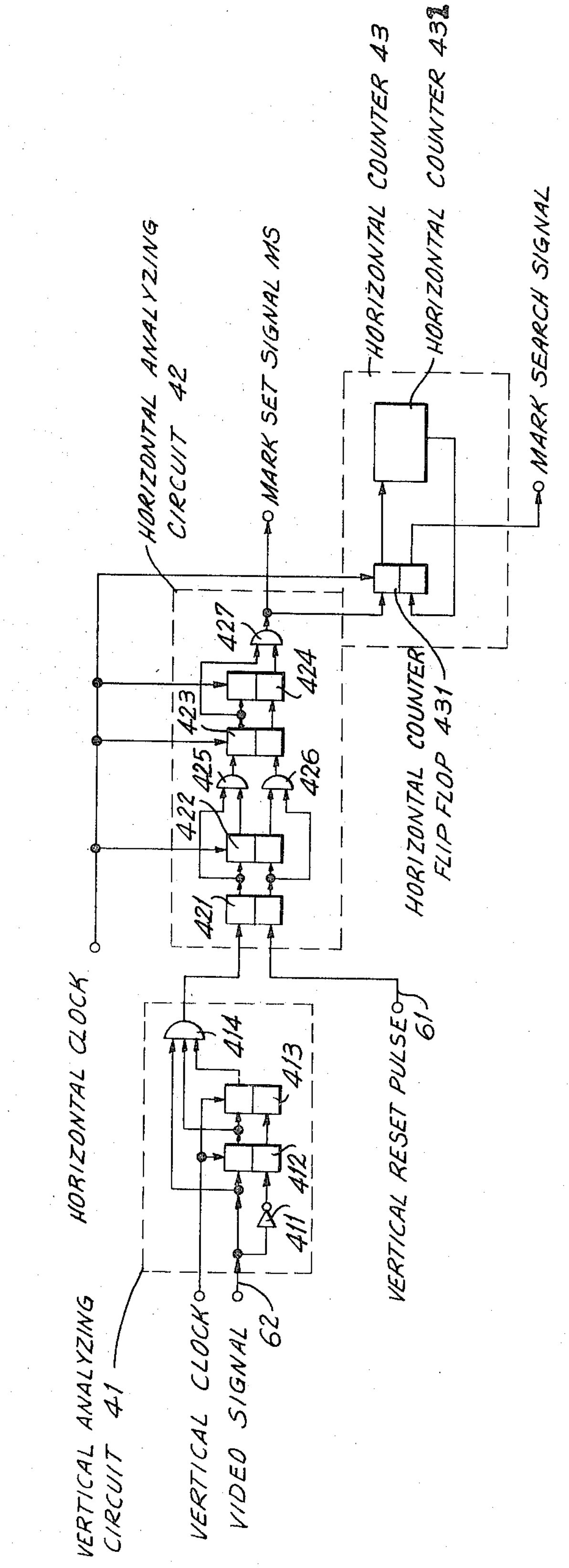
Figure 5B:
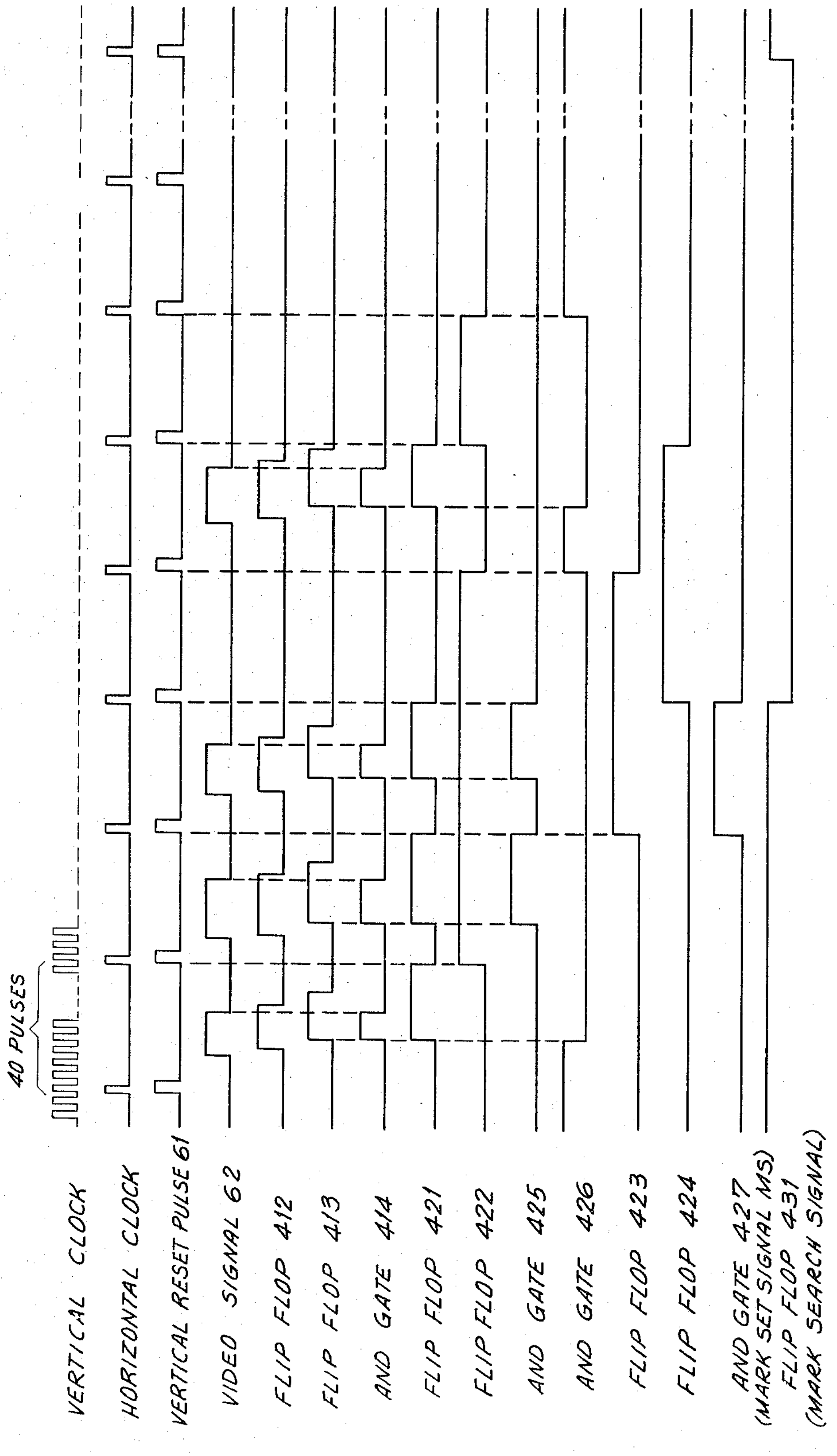

FIG. 5*a* is a block diagram of an embodiment of a horizontal positioning circuit for positioning the character region in accordance with the detection of the position mark;

FIG. 5*b* is a time chart showing the operation and time relation of various parts of the horizontal positioning circuit of FIG. 5*a;*

Figure 6A:
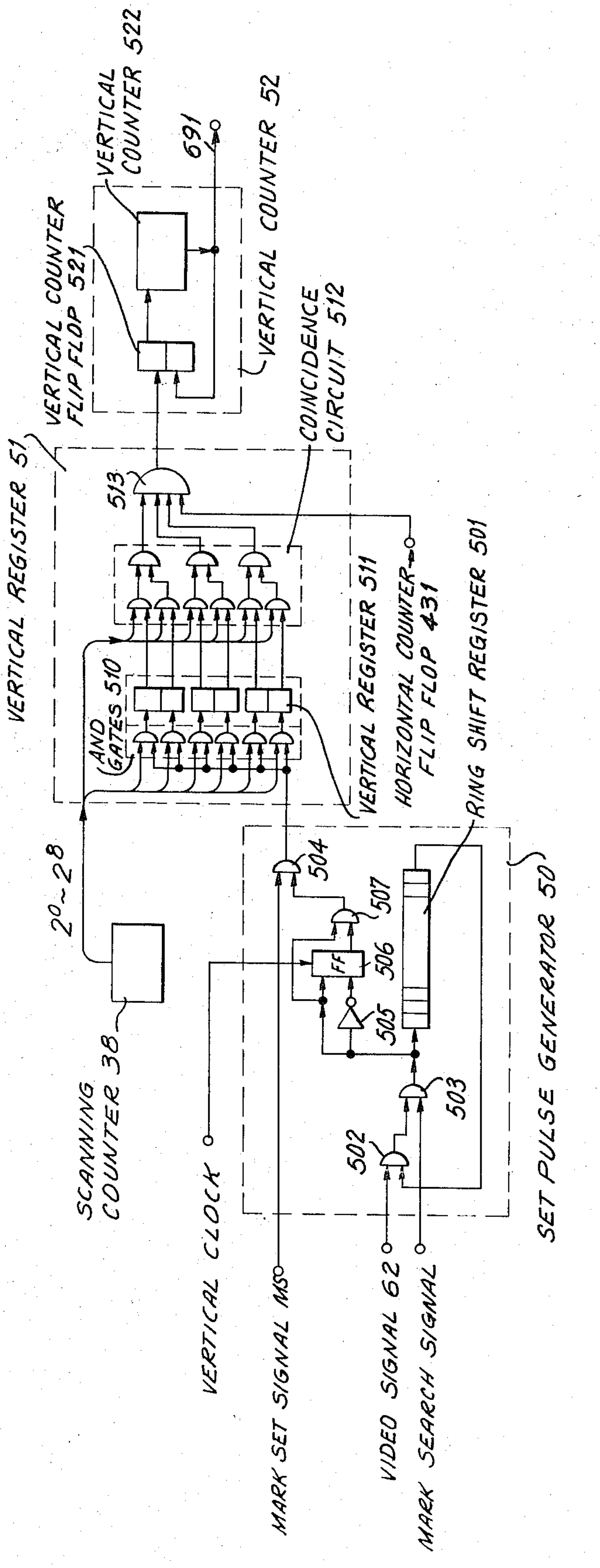
Figure 6B:
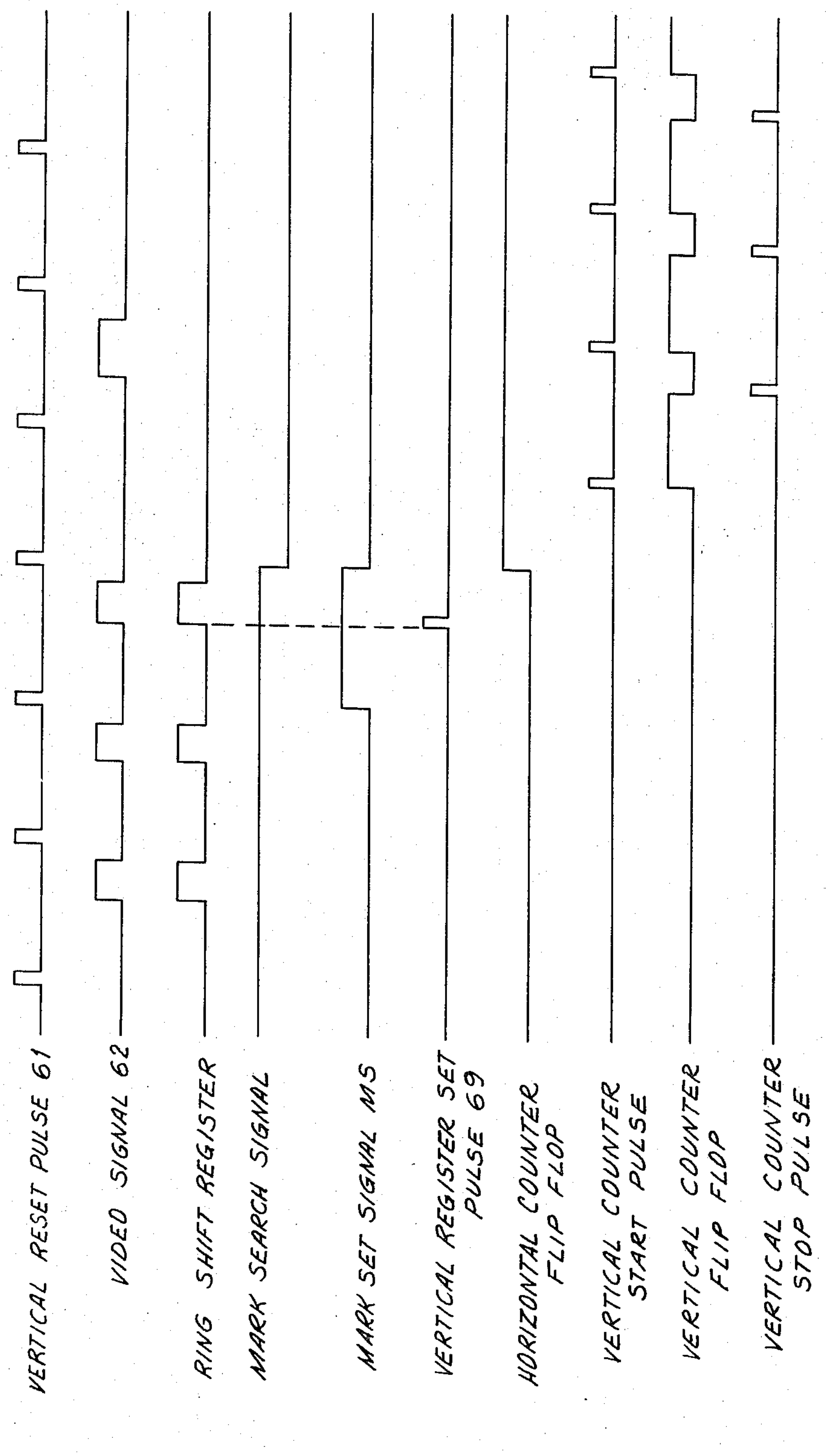

FIG. 6*a* is a block diagram of an embodiment of a vertical positioning circuit for positioning the character region in accordance with the detection of the position mark;

FIG. 6*b* is a time chart showing the operation and time relation of various parts of the vertical positioning circuit of FIG. 6*a;*

Figure 7:
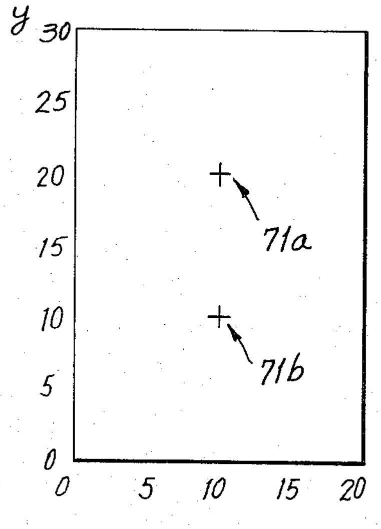
Figure 8A:
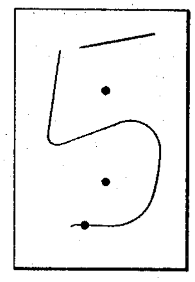
Figure 8B:
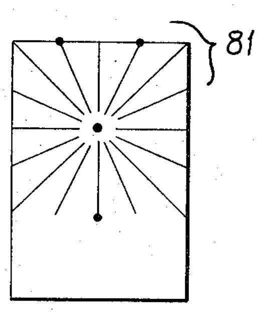
Figure 8C:
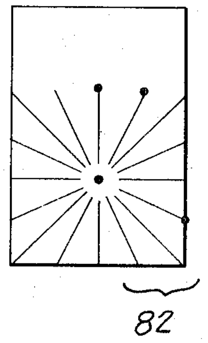
Figure 9A:
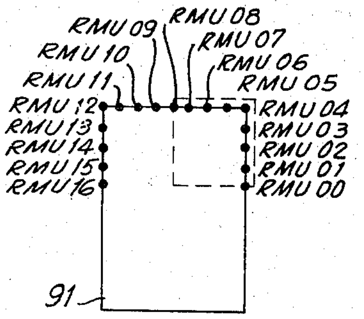
Figure 9B:
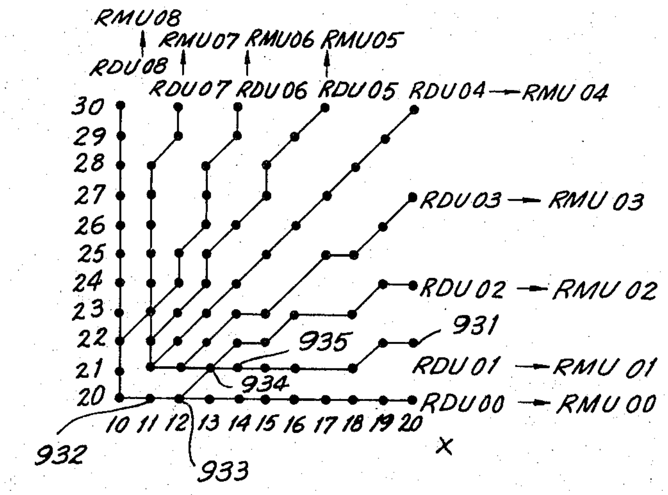
Figure 10:
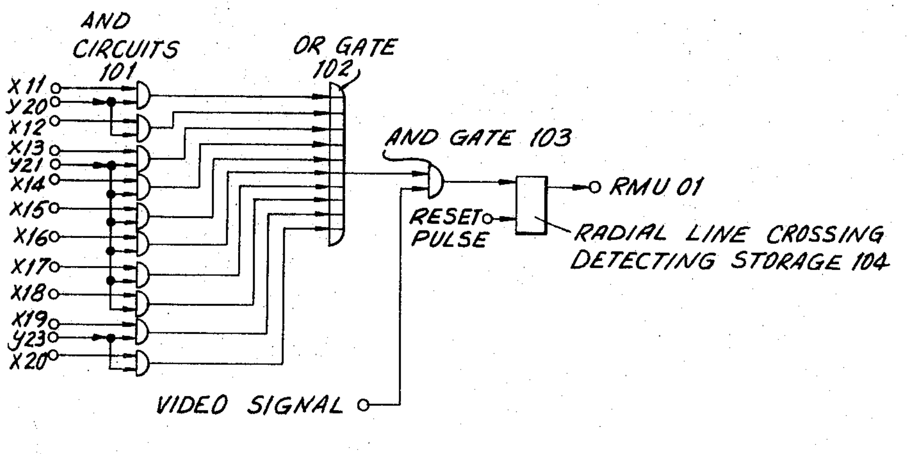

FIG. 7 is a schematic diagram showing the writing guide points in a character region in the system of the invention;

FIGS. 8*a*, 8*b* and 8*c* are schematic diagrams illustrating the stroke crossing detecting method for detecting a handwritten character in a character region;

FIGS. 9*a* and 9*b* are graphical presentations illustrating the details of the radial lines extending from the writing guide points;

FIG. 10 is a circuit diagram of an embodiment of a stroke crossing detecting circuit for executing the stroke crossing detecting method of FIGS. 8*a*, 8*b* and 8*c;*

Figure 11A:
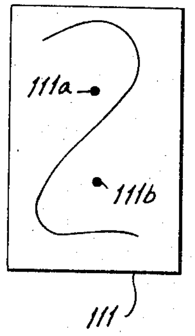
Figure 11B:
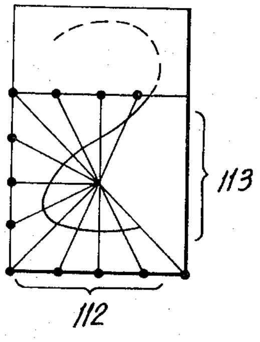
Figure 11C:
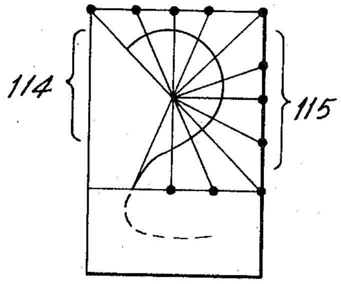
Figure 12A:
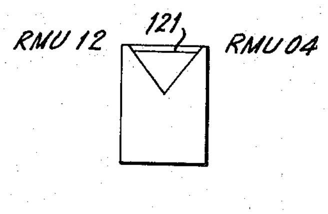
Figure 12B:
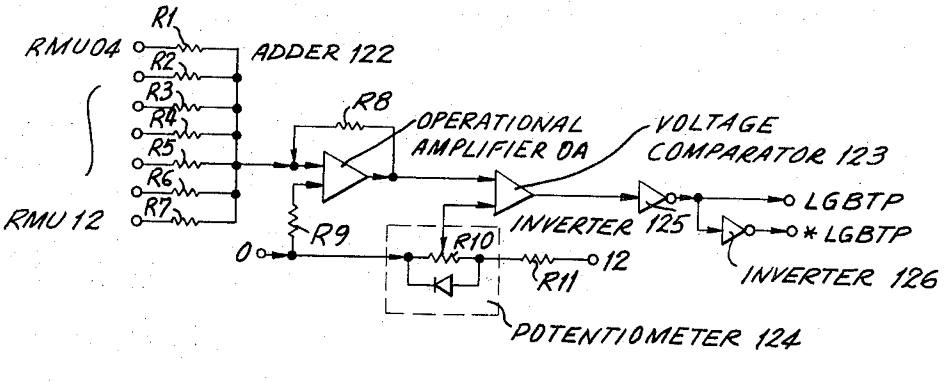

FIGS. 11*a*, 11*b* and 11*c* are schematic diagrams showing the stroke crossing detecting method for detecting a character in a character writing frame;

FIGS. 12*a* and 12*b* are a schematic diagram and a circuit diagram of an embodiment of a stroke detecting circuit for executing the stroke crossing detecting method of FIGS. 8*a*, 8*b* and 8*c;*

Figure 13A:
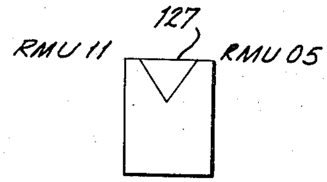
Figure 13B:
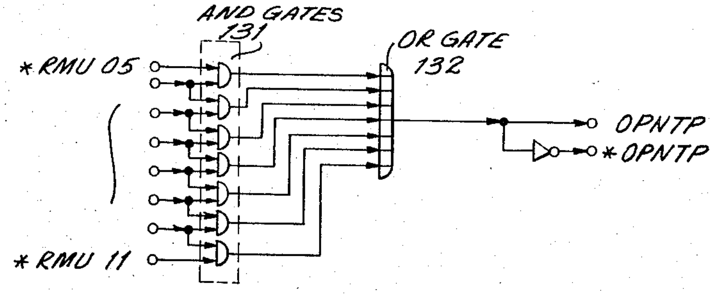
Figure 14:
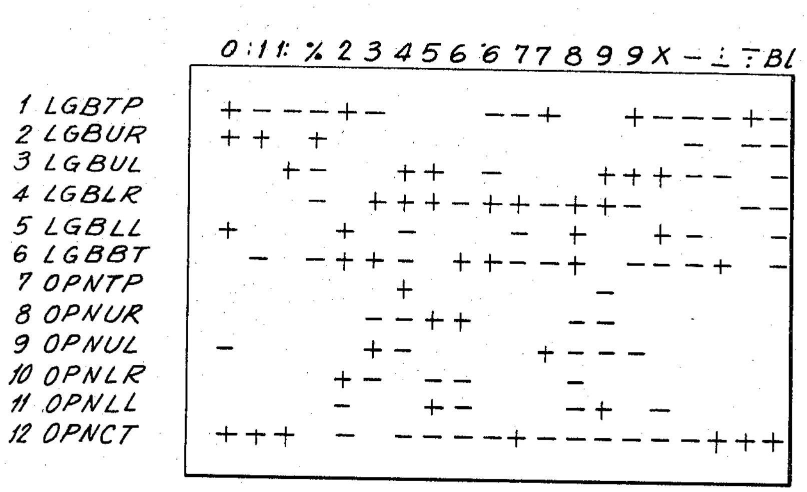

FIGS. 13*a* and 13*b* are a schematic diagram and a circuit diagram of an embodiment of an opening part detecting circuit for detecting the opening part of a character in a character region; and FIG. 14 is a table showing the features of various characters for discriminating the detected character.

FIG. 1 is an example of card 10 read by an optical character reading device (not shown in FIG. 1) used in the system of the invention. The card 10 is fed leftward in the drawing as shown by an arrow 13. Position marks 11 and characters in character regions 12 on the card 10 are read in succession by continuous raster scanning, as indicated by lines 14. A cathode ray tube, Vidicon or a head comprising a plurality of silicon photocells arranged in a line can be used as the signal input means for performing the raster scanning. In the embodiment of the character recognizing system of the invention described hereinafter, the raster scanning is performed by distributing a series of reading pulses to reading signals obtained from a head comprising silicon photocells.

Figure 2A:
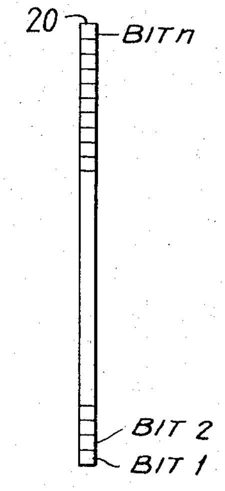
Figure 2B:
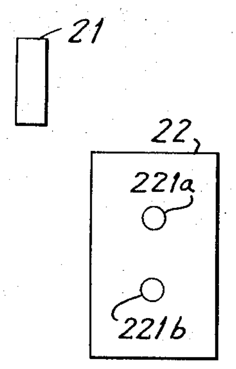
Figure 2C:
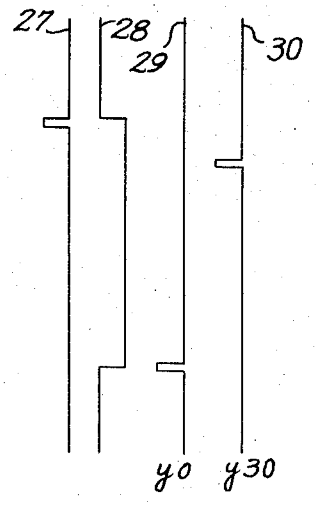
Figure 2D:
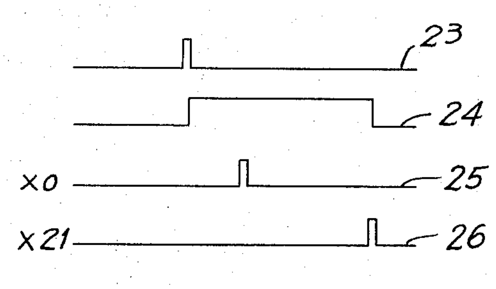

FIGS. 2*a*, 2*b*, 2*c* and 2*d* explain the operation of the system of the invention and show the relation between the detected position of a position mark on a card and the operations of counters for determining the horizontal and vertical positions of the character region. The horizontal and vertical positions of a position mark 21 (FIG. 2*b*) are detected by the mark search mode from the input information obtained by the raster scanning via a reading element 20 (FIG. 2*a*). Horizontal and vertical counters 24 (FIG. 2*d*) and 28 (FIG. 2*c*) for determining character region 22 (FIG. 2*b*) are started by a horizontal position detecting signal 23 (FIG. 2*d*) and a vertical position detecting signal 27 (FIG. 2*c*). This makes it possible to detect horizontal coordinates 25 and 26 (FIG. 2*d*) and vertical coordinates 29 and 30 (FIG. 2*c*) showing the edges of the character region 22 (FIG. 2*b*) having a constant relation with the position mark 21 (FIG. 2*b*).

FIG. 3 is an embodiment of an optical character reading device used in the system of the invention. Characters 302 and position marks 301 on a card 30 are irradiated by a light source lamp 303, then focused on a silicon reading head 31 comprising small silicon photocells arranged in a line via a lens system 304. The silicon reading head 31 photoelectrically transduces the light to electrical signals. Reading pulses are produced by a scanning counter 38 and are used for the scanning and reading of the signals produced by the reading head 31. The reading pulses are supplied to a reading scanner 32 as reading signals available by the raster scanning.

The reading signals are amplified up to a constant amplitude by the reading scanner 32 and are then converted into signals of "1" and "0" levels by an analog to digital converter 33. The horizontal and vertical positions of the read information thus obtained are then detected by a position mark detecting circuit 34, and a horizontal counter 35 is started by a horizontal position detecting signal 341. The vertical position is recorded in a vertical register 39, and each time the scanning position becomes equal to the content recorded in said vertical register in each scanning, a vertical counter 391 is started by a vertical position detecting signal 392.

Horizontal and vertical position informations obtained by the aforedescribed operation are combined with the image signals, and the stroke of the character is detected by a stroke detecting circuit 36. The stroke detecting circuit 36 is a feature extracting circuit for insuring the correct extraction of the features of the character, even where the read character is deformed in various manner in size and configuration. After the features of the character are extracted, a character discriminating circuit 37 discriminates the read character by the combination of the features obtained.

Several of the circuits of FIG. 3 are hereinafter described in detail. FIG. 4*a* shows a signal detecting circuit comprising the silicon reading head 31, the reading scanner 32, the analog to digital converter 33, and the scanning counter 38. FIG. 4*b* shows waveforms of various parts of the signal detecting circuit of FIG. 4*a.* FIG. 4*c* shows an embodiment of the switching circuit B of FIG. 4*a.* FIG. 4*d* shows an embodiment of the scanning counter 38. Images focused on reading elements Sl to S*n* of the silicon reading head 31 are photoelectrically transduced by said reading elements, then amplified by preamplifiers Al to A*n* and are supplied to a switching circuit B, well known in this art as an analog gate circuit.

As shown in FIG. 4*c*, the switching circuit B comprises a plurality of AND gates 1 to *n* and an OR gate 1 and sends out a coincidence pulse through said OR gate when the coincidence of parallel signals Al to A*n* from the card and signals from the scanning counter 38 can be obtained by at least one AND gate. The scanning counter 38, from which signals are applied to the switching circuit B, as hereinbefore described, may comprise, for example, the circuit of FIG. 4*d.* If an operation starting signal SS is supplied to the scanning counter 38, coincidence is obtained by AND gates 401, 402, 403 and 405, and a monostable multivibrator MM is set because no output is sent out from monostable multivibrators MM*bl* to MM*bn* and "1" signals are sent out from an inverter 404.

After a specified constant period of time, the monostable multivibrator MM is reset. At such instant, a pulse of a constant width is sent out from the monostable multivibrator MM. The output pulse of the monostable multivibrator MM is used as the vertical reset pulse 61 in the following explanation. When the monostable multivibrator MM is reset, monostable multivibrators MM*al* to MM*an* and flip flops FFl to FF*n* are set and are held to their set condition until scanning pulses Pl to P*n* are generated corresponding to the reading elements Sl to S*n*. By sequentially varying the time constants of the monostable multivibrators MM*al* to MM*an* to the width of the scanning pulses, it is possible to sequentially drive the monostable multivibrators MM*bl* to MM*b* n and obtain sequential scanning pulses Pl to P*n* as shown in FIG. 4*b*.

When the monostable multivibrator MM*al* is reset, the monostable multivibrator MM*bl* is set through the AND gate 403 by the signal of the flip flop FFl to generate the pulse Pl of a specific constant width and is reset. Simultaneously, the monostable multivibrator MM*b*2 is set to generate the pulse P2. Thus scanning pulses Pl to P*n* are generated sequentially. When the generation of the scanning pulses Pl to P*n* is stopped, the sending out of signals through the OR gate 2 is also stopped, with the result that the monostable multivibrator MM is again set through the AND gate 405 and the next scanning is started.

By the application of scanning pulses Pl to P*n*, thus obtained, to the switching circuit B, series video signals S are sent out from the switching circuit B (FIG. 4*a*). The series video signals S are signals available by the scanning of the signals obtained in parallel from the reading elements. The signals S are passed through a smoothing circuit C and an amplifying circuit D (FIG. 4*a*) and are converted into waveforms *a* as shown in FIG. 4*b*. The waveforms *a* are then converted into digital signals "1" and "0", that is, video signals 62 (FIG. 4*b*), by the analog to digital converter 33 (FIGS. 3 and 4*a*) and the signals are supplied to the position mark detecting circuit 34 (FIG. 3). High levels of waveforms *a* are indicated as black portions on the card of FIG. 1 and low levels are indicated as white portions, and "1" signals 62 are indicated as black portions and "0" signals 62 are indicated as white portions.

FIG. 5*a* shows a horizontal positioning circuit comprising a vertical analyzing circuit 41, a horizontal analyzing circuit 42 and a horizontal counter circuit 43, provided in the position mark detecting circuit 34 (FIG. 3). The horizontal positioning circuit detects the horizontal position of the position mark, generates the detection pulses and also operates the horizontal counter 43. In order to confirm that the read information signals or video signals 62 obtained by the raster scanning surely indicate the position mark, the vertical analyzing circuit 41 confirms that the duration of the video signals 62 continues for three bits and the horizontal analyzing circuit 42 also confirms that this occurred over two scanning periods. That is, supplied video signals 62 are shifted by flip flops 412 and 413 and the vertical clock, and if the application of the video signals 62 still continues when the signals are sent out from the flip flop 413 to an AND circuit 414, that is, if the duratjon of the video signals 62 continues for three bits, the signals are sent out to the horizontal analyzing circuit 42 in the next stage.

The aforedescribed operation determines whether or not the duration of the video signals 62 indicating the position mark continues for three bits. A NOT circuit 411 sends out signals for resetting the flip flops 412 and 413 when the video signals are not supplied. Signals from the vertical analyzing circuit 41 are stored in a flip flop 421 of the horizontal analyzing circuit 42 and are transferred to a flip flop 422 by the horizontal clock. At such instant, the flip flop 421 is reset by vertical reset pulses 61 generated in the stop period of the vertical scanning operation. Then, the next scanning period is entered and the vertical analysis of the video signals is achieved by the vertical analyzing circuit 41 in the same manner as hereinbefore described and signals are sent out through the AND circuit 414 as in the former scanning period.

When the flip flop 421 is set, signals are sent out through an AND circuit 425 because the flip flop 422 was also set in the former scanning period. A flip flop 423 is set by the next horizontal clock. This shows that the flip flop 423 is set when sufficiently long "black signals" of the position mark signals are generated over two continuous scanning periods. When the flip flop 423 is set and a flip flop 424 is in the reset condition, an AND circuit 427 is made conductive and a mark set signal MS is sent out. The mark set signal MS is continued for one scanning period because the condition of the flip flop 423 is transferred to the flip flop 424 by the next horizontal clock.

When the mark set signal MS delays, that is, when a horizontal clock is supplied, a horizontal counter flip flop 431 of the horizontal counter circuit 43 is reset, the mark search signal is cut off, and a horizontal counter 432 is operated. The horizontal counter 432 produces a stop pulse, and stops after it is operated for a constant period of time. Then, the horizontal counter flip flop 431 is set and the mark search signal is again transmitted.

As shown in FIG. 5*b*, the sending out of the mark search signal is stopped during the period of operation of the horizontal counter 432 to avoid a search of the position marks during this period. As shown in FIG. 2, the horizontal counter 432 is prearranged so that X may be equal to zero on the left side of the writing frame and $X=20$ on the right side and the counting operation may be stopped when the counter number reaches $X=20$. FIG. 5*b* is a time chart showing the operation of parts of the circuit of FIG. 5*a*.

FIG. 6*a* shows a vertical positioning circuit comprising a set pulse generating circuit 50, a vertical register circuit 51 and a vertical counter circuit 52. The vertical positioning circuit is provided in the position mark detecting circuit for determining the top and bottom positions of a character region by position marks. Before determining the top and bottom positions of a character region by position marks. Before determining the top and bottom positions of a character region, the vertical position of the position mark must be confirmed, and this can be achieved by utilizing the mark set signal MS sent out from horizontal analyzing circuit 42 and recording and holding the lowest position of the position mark detected within a scanning period during which said mark set signal MS continues. If video signals of the position mark are supplied when there are mark search signals. The video signals are supplied to a ring shift register 501 having a length equivalent to one scanning period.

The portion of logic "1" of the signals sent out from the ring shift register 501 indicates the position mark and the rising portion of the signal indicates the lowest position of the position mark. As far as the mark search signals are supplied, the video signals are circulated any time through an OR circuit 502 and an AND circuit 503. When the mark set signal MS is applied, signals indicating the lowest position of the position mark are sent out from the ring shift register 501 and are supplied through an AND circuit 504 to a group of AND gates 510 in a stage preceding a vertical register stage 511. On the other hand, scanning pulses sent out from the scanning counter 38 are also applied to the group of AND gates 510. Thus, the lowest position of the position mark is stored in the vertical register 511.

The vertical position of the position mark can be determined by the aforedescribed operation. The set pulse generator 50 comprises a NOT circuit 505, a flip flop 506 and an AND circuit 507. The flip flop 506 is set by the signals indicating the lowest position of the position mark, but when the supply of signals from the ring shift register 501 or the video signals 62 are stopped, the flip flop 506 is reset by the application of the horizontal clock. The AND circuit 507 is made conductive when the flip flop 506 is in the set condition and the signals indicating the lowest position of the position mark are supplied. After the vertical position of the position mark is stored in the vertical register 511, a signal is sent out to an AND circuit 513 each time the content of the scanning counter 38 for showing the scanning position coincides with the content of said vertical register in a coincidence circuit 512.

If at such time the horizontal counter flip flop 431 of FIG. 5*a* is in the set condition, signals are sent via the AND circuit 513 to a vertical counter circuit 52 to set a vertical counter flip flop 521 thereof, whereby a vertical counter 522 starts to operate. As shown in FIG. 2, the vertical counter 522 is prearranged so that Y may be equal to zero on the lower side of the character writing frame and $Y=30$ on the upper side, and therefore the correct position of the character writing frame can always be known from the vertical position of the position mark.

The vertical positioning circuit 6*a* is described with reference to FIG. 6*b*. The rising portion of the output 63 of the ring shift register 501 is detected in the scanning period in which the mark set signal is "1", and a vertical register pulse 69 is produced by this rising portion. The content of the scanning counter 38 is set in the vertical register 511 by the set pulse 69 and is held until the next position mark is reached. If the vertical position of the position mark is then correctly set in the vertical register 511, a vertical counter start pulse 691 is produced each time the scanning position reaches the set vertical position of the position mark in the following scanning period, that is, while the horizontal counter is in operation. Simultaneously, the vertical counter flip flop 521 is set and the operation of the vertical counter 522 is started. The vertical counter 522 is operated for a constant period of time and is then stopped by the production of an end pulse 693.

By making the outputs of the horizontal counter 432 (FIG. 52) and the vertical counter 522 (FIG. 6*a*) $X_0$ to $X_{20}$ and $Y_0$ to $Y_{30}$, respectively, as hereinbefore described, a coordinate system, as shown in FIG. 7, can be provided on the character writing frame.

The method of the present invention for recognizing a character in a character writing frame by the utilization of the coordinate system is hereinafter described. In my invention, moreover, as shown in FIG. 7, the character writing frame is provided with writing guide points 71*a* and 71*b* in addition to the coordinate system. The system of the invention may therefore use a feature extracting method more simplified compared with the conventional method of this type, and may provide a stabilized and inexpensive device.

In accordance with the invention, a character is handwritten in the character writing frame 22 of FIG. 2 without the character contacting writing guide points 221*a* and 221*b* (FIG. 2). The frame 22 and, as shown in FIGS. 8*b* and 8*c*, radial coordinate lines 81 and 82 are radially extended from the writing guide points over the hand written character. Then, the points of intersection of the coordinate lines and the character and the angles between the lines constituting the character and the coordinate lines are detected. Thus, it is possible to achieve an excellent feature extraction which is not readily affected by various modifications of the character in configuration and size.

When only numerals are written in the character writing frames, it is advantageous to provide two, that is, upper and lower writing guide, points in the frame. In this case, as shown in FIGS. 8*b* and 8*c*, two groups 81 and 82 of radially extending lines are provided from the two writing guide points 71*a* and 71*b* (FIG. 7) and the crossing of these radial lines and the character is detected, whereby the feature of the character can be extracted with high stability accuracy or precision. The crossing of the radial line groups 81 and 82 and the character is recorded in a storage and is checked at the end of the scanning of the character. The radial lines can be generated by generating horizontal and vertical coordinate pulses $X_0$ to $X_{20}$ and $Y_0$ to $Y_{30}$ (FIG. 7), the positions of which have specific correct relations with the positions of the writing guide points. This is explained with reference to FIGS. 9*a*, 9*b* and 10.

In FIG. 9*a*, radial lines in a dotted line section 92 overlapping a writing frame 91 are distributed as shown in FIG. 9*b*. The same pattern as in FIG. 9*b* can be used repeatedly in the other sections of the writing frame.

FIG. 10 shows a crossing detecting circuit which corresponds to a radial line 931 of FIG. 9*b*. The crossing detecting circuit detects whether or not a radial line crosses the written character. The actual circuit structure of FIG. 10 is such that it detects whether or not several points constituting a radial line cross the written character. One of the AND circuits of a group 101 of AND circuits of FIG. 10 is made conductive when the corresponding point of points 932, 933, 934, . . . having coordinates (*x*11, *y*20), (*x*12, *y*20), (*x*13, *y*21), . . . respectively, on a radial line RDU01 of FIG. 9*b* is read. If a video signal produced by the reading is supplied when one of the AND circuits is conductive, a flip flop 104, which is the radial line crossing detecting storage, is set.

If it is assumed that the point 932 of FIG. 9*b* is being read and scanned, the AND circuit having inputs connected to terminals *x*11 and *y* 20 in FIG. 10 is made conductive, and a signal is supplied to an input terminal of an AND circuit 103 via an OR gate 102. If it is also assumed that the handwritten character crosses the point 932, a video signal is supplied through the reading head to the other input terminal of the AND circuit 103, whereby said AND circuit is made conductive and its output is stored in the radial line crossing detecting flip flop 104. The crossing of the radial line by a part of the character may thus be recorded in the detecting flip flop 104. While the detection of the crossing of the radial line RDU01 and the character has been described, the crossing of all the other radial lines and the character can be detected in the same manner.

Hereinafter described, with reference to an embodiment, is how the crossing recording storages are used in the recognition of the character written in the character writing frame. It is assumed that a character "2" is written in a character writing frame 111 provided with two writing guide points 111*a* and 111*b*, as shown in FIG. 11*a*. First, when radial lines are radially extended from the lower writing guide point 111*b*, the crossing recording storages of the crossing detecting circuits of the radial lines on the side 112 of the frame are all set whereas the crossing recording storages of the crossing detecting circuits of the radial lines on the side 113 of the frame are in the reset condition (FIG. 11*b*). When radial lines are radially extended from the upper writing guide point 111*a*, the crossing recording storages of the crossing detecting circuits of the radial lines on the side 115 of the frame are all set whereas the crossing recording storages of the crossing detecting circuits of the side 114 of the frame are in the reset condition (FIG. 11*c*).

Various features of the character can be detected in view of the set and reset conditions of the crossing recording storages thus obtained. More specifically, the features detected are the positions, magnitudes and continuity of points of the radial lines which cross or do not cross the character. These are effective means characterizing the character, and by the utilization of these means, it is possible to achieve the character recognition which is not readily affected by the size and configuration of the character.

It has been confirmed that in the actual reading of a numeral as hereinbefore described, features of the numeral can be detected by dividing the region around the writing guide points into seven regions, that is, top, center, bottom, upper right, lower right, upper left and lower left regions, and detecting the presence of a long black (LGB) line and the presence of an opening (OPN) portion in each region. FIG. 12*b* shows an embodiment of a long black line detecting circuit.

The long black line detecting circuit adds the outputs of the set radial line crossing detecting storages from the storages for radial lines RDU04 to RDU12, which are terminated on the top side of the character writing frame from the radial lines extending from the upper writing guide point in the frame, detects whether or not the value available by the addition operation is above a specific constant value, and thereby discriminates whether or not the line constituting the handwritten character crossing the radial line is long.

In FIGS. 12*a* and 12*b*, RMU04 to RMU12 are the outputs of radial line crossing detecting storages for indicating the crossing of the radial lines RDU04 to RDU12 and the character. The circuit of FIG. 12*b* includes resistors R1 to R11, an adder 122 comprising the resistors R1 to R8, an operational amplifier OA, a voltage comparator 123, a potentiometer 124 and inverters 125 and 126. Ther operational amplifier OA, the voltage comparator 123 and the potentiometer 124 are well known circuits. The adder 122, which may comprise an operational amplifier, is also a well known circuit.

The adder 122 is hereinafter generally explained. If the input voltages applied to the input terminals are $e_1$, $e_2$, . . . $e_n$, the input resistances of the input resistors Rl to Rn are $R_1$, $R_2$, . . . $R_n$, feedback resistance of the feedback resistor is $R_f$, the degree of amplification of the operational amplifier OA is −A and output voltage is $e_0$, $$\frac{e_1+\frac{e_0}{A}}{R_1}+\frac{e_2+\frac{e_0}{A}}{R_2}+\cdots+\frac{e_n+\frac{e_0}{A}}{R_n}=-\frac{e_0+\frac{e_0}{A}}{R_f}.$$

The foregoing equation is obtained because the sum of the currents supplied to the operational amplifier OA becomes zero. By making the degree of amplification of the operational amplifier OA a sufficiently large value, that is, infinite, the equation may be rewritten as $$e_1/R_1 + e_2/R_2 + \ldots + e_n/R_n = - e_0/R_f.$$

If it is assumed that the input resistances can be written as $R_1 = R_2 = \ldots = R_n = R$, the output voltage $e_0$ can be expressed as $$e_0 = - R_f/R\ (e_1 + e_2 + \ldots + e_n).$$

It can be seen from the last equation that a negative output voltage corresponding to the sum of the input voltages can be obtained because the input resistance R and the feedback resistance $R_f$ can be predetermined. The voltage thus obtained is compared by the voltage comparator 123 with a constant negative reference level voltage provided by the potentiometer 124. The voltage comparator 123 may comprise a differential amplifier. Whether the line constituting the handwritten character crossing the radial lines terminated on the top side of the character writing frame is long or short can be determined from the result of the comparison by the voltage comparator 123. When the line is long, a signal LGBTP, which indicates a long black top line, which is the signal showing that a long line crosses the radial lines terminated on the top side of the character writing frame, can be obtained. When the line is short, a signal *LGBTP, which indicates a short black top line, can be obtained.

As will be seen from the above explanation, LGBTP signals detected by the long black line detecting circuit of FIG. 12*b*, as shown by 121 in FIG. 12*a*, show the cumulation value of the angles formed by the line of the character present within a fan-shaped region in the top section of the writing frame. The feature is extracted in the same manner in the center, bottom, upper left, lower left, upper right and lower right regions of the writing frame.

FIG. 13*b* is an opening portion detecting circuit. For example, signal OPNTP, which indicates an open top can be obtained by the detection of an open portion in the top section 127 of the character writing frame (FIG. 13*a*). The OPNTP signal is produced by the detection of the fact that the character does not cross both adjacent radial lines of the radial lines RMU05 to RMU11 extending from the upper writing guide point in the frame. Two storages for detecting the crossing of the character and two adjacent radial lines are connected to the input terminals of each of the AND circuits of a group 131 of AND circuits.

The signal OPNTP can be obtained via an OR circuit 132 when the two storages are not set. Conversely, when signals produced by the set condition of the storages are applied to one or both of the input terminals of the AND circuit, a signal *OPNTP, which indicates the absence of an open or opening portion in the top section of the frame, is sent out. An open or opening portion in the center, bottom, upper left, lower left, upper right and lower right sections or regions of the frame is determined in the same manner.

FIG. 14 shows the features of long black LGB signals and open OPN signals obtained by circuits similar to the circuits of FIGS. 12*b* and 13*b* from the top, center, bottom, upper right, lower right, upper left and lower left sections of a character writing frame corresponding to a character written in the frame. A character written in a character writing frame on a card can be determined or discriminated by comparing the feature extracted from the character with the features shown in the table of FIG. 14.

In FIG. 14, LGB indicates long black line signals and OPN indicates open or opening signals. TP, UR, UL, LR, LL, BT and CT denote the top, upper right, upper left, lower right, lower left, bottom and center sections, respectively, of a character writing frame. + marks indicate the presence of LGB and OPN signals and − marks indicate the absence of LGB and OPN signals, that is, the presence of *LGB and *OPN signals. Marks are not written in some sections of the table of FIG. 14, because in such sections signals produced by the determination or extraction of the feature are not necessary.

For the sake of illustration, it is assumed that "0" is written in a character writing frame. The feature of the presence of signals LGBTP, LCBUL, LGBLL and OPNCT and the absence of signal OPNUL can be extracted. By comparing this feature with the features of FIG. 14, it can be determined or discriminated that the character is "0". Thus handwritten or printed characters on cards can be read and discriminated. Needless to say, characters can also be recognized by passing signals indicating features through a decoding circuit.

While the invention has been described by means of specific examples and in a specific embodiment, I do not wish to be limited thereto, for obvious modifications will occur to those skilled in the art without departing from the spirit and scope of the invention.

I claim:

1. A character identification system, comprising read-out means which, from a slip having thereon at least one position mark, a character entry frame placed in a specific position relative to the position mark and at least one character entry guide point positioned within the character entry frame, reads out the position mark and characters within the character entry frame by raster scanning means; position mark detecting means for detecting the position mark prepared for determining the character entry position by using a signal obtained by the read-out means; horizontal position indicating means for indicating a character entry area in the direction of transfer of the slip, said slip having therein a character entry frame which shows the character entry area maintained in a specific positional relation with the position mark detected by the position mark detecting means and a position on a horizontal axis selecting a corner of the character entry range as an original point; vertical position indicating means for indicating the character entry range in the vertical direction of the character entry area determined by the direction of transfer of the slip or the position on the vertical axis selecting the corner in the character entry area as an original point; character detecting means for detecting a character crossing a position on a coordinate by detecting the coordinate position being scanned by the raster scanning means by means of the horizontal and vertical position indicating means and by detecting the presence or absence of a signal; a plurality of crossing detecting means, storage means connected to said crossing detecting means, said storage means storing the detection result of the character detecting means in said crossing detecting means obtained by detecting the character passing at least one coordinate position of a plurality of coordinate positions predetermined in the form of a plurality of radial lines between the coordinate position used as the character entry guide point within the character entry frame and each coordinate position forming the character entry frame; character extracting means for extracting the feature of a character within the character entry frame in accordance with the crossing conditions obtained by a plurality of the crossing detecting means of the storage means; and identifying means for identifying the character entered in the character entry area in accordance with the feature of the character provided by the character extracting means.

* * * * *